(12) United States Patent
Krajec

(10) Patent No.: US 7,456,847 B2
(45) Date of Patent: Nov. 25, 2008

(54) VIDEO WITH MAP OVERLAY

(76) Inventor: Russell Steven Krajec, 820 Welch Ave., Berthoud, CO (US) 80513

( * ) Notice: Subject to any disclaimer, the term of this patent is extended or adjusted under 35 U.S.C. 154(b) by 902 days.

(21) Appl. No.: 10/710,904

(22) Filed: Aug. 12, 2004

(65) Prior Publication Data

US 2004/0239688 A1 Dec. 2, 2004

(51) Int. Cl.
*G06T 15/00* (2006.01)

(52) U.S. Cl. ............... 345/629; 345/157; 345/581; 340/901; 340/989; 701/207; 701/216

(58) Field of Classification Search .......... 345/629, 345/419, 581, 157, 158; 340/901, 908, 989, 340/990; 701/207, 208, 216, 217
See application file for complete search history.

(56) References Cited

U.S. PATENT DOCUMENTS

| | | | |
|---|---|---|---|
| 5,815,411 A | 9/1998 | Ellenby et al. | |
| 6,037,936 A | 3/2000 | Ellenby et al. | |
| 6,064,398 A | 5/2000 | Ellenby et al. | |
| 6,101,431 A | 8/2000 | Niwa et al. | |
| 7,301,536 B2 * | 11/2007 | Ellenby et al. | ............... 345/419 |
| 2002/0163521 A1 | 11/2002 | Ellenby | |
| 2002/0175994 A1 | 11/2002 | Sakakibara et al. | |
| 2003/0218675 A1 | 11/2003 | Nonoyama | |

* cited by examiner

*Primary Examiner*—Phu K Nguyen
(74) *Attorney, Agent, or Firm*—Russell Krajec; Krajec Patent Offices, LLC

(57) ABSTRACT

A system and method for placing reference locators on a streaming video image taken from a camera mounted on a vehicle. Sensors monitoring the camera field of view and direction of the optical axis along with sensors monitoring the vehicle's position are used to generate a video overlay having various indicia. The calculated positions of the indicia may be compared to the position of landmarks taken from the video image to compensate for any inaccuracies in the calculated position taken from the various sensors.

20 Claims, 10 Drawing Sheets

600 — SYSTEM FOR VIDEO GENERATION USING FEED BACK FROM LANDMARKS

626 — CORRECTION FACTORS

VIDEO WITH MAP OVERLAY

TECHNICAL FIELD

The present invention pertains generally to map displays and specifically to map displays that are superimposed on a video image.

BACKGROUND ART

Video monitoring and surveillance devices often provide important and useful information for law enforcement and military applications. For example, a helicopter may monitor a law enforcement pursuit of a suspect. A person in the helicopter may aid ground officers by directing them to the suspect.

The helicopter may use a camera with a telephoto lens to zoom in on the suspect and track the suspect's movements. When the field of view becomes narrow, the information displayed on the video image may not have enough reference points on the image to easily direct ground officers.

It would therefore be advantageous to provide a system and method whereby a video image taken from a camera mounted on a vehicle may have reference designators added to the image.

DISCLOSURE

Technical Problem

Technical Solution

The present invention overcomes the disadvantages and limitations of previous solutions by providing a system and method for placing reference locators on a streaming video image taken from a camera mounted on a vehicle. Sensors monitoring the camera field of view and direction of the optical axis along with sensors monitoring the vehicle's position are used to generate a video overlay having various indicia.

In some embodiments, the calculated positions of the indicia are compared to the position of landmarks taken from the video image to compensate for any inaccuracies in the calculated position taken from the various sensors.

Two different modes of operations may be used separately or together. The first mode of operation includes dead reckoning or feed forward control, where the sensors alone are used to determine the actual vehicle position and camera direction and field of view. These sensors are then used to determine the positions of various indicia for the video stream.

The second mode involves a feedback control, there the predicted positions of the indicia are compared to actual landmarks in the video image. The feedback calculations may be done periodically to realign the video image and indicia with the normal operation being performed with the feed forward control. In other embodiments, the feedback control may be used constantly. In one particular embodiment, two cameras are mounted with parallel optical axes: a wide angle image that is used with the feedback control system, and a simultaneous telephoto image used for the image containing the indicia. In another embodiment, two cameras are used with non-parallel optical axes. One camera may be used to determine or refine the position of the vehicle.

An embodiment of the present invention may include a system comprising: a vehicle having vehicle position sensors; a first video camera mounted to the vehicle and having camera position sensors and producing a first video feed in a first camera field of view; a field of view calculator adapted to use the vehicle position sensors and the camera position sensors to produce a first calculated field of view; an indicia generator adapted to use the first calculated field of view to produce at least one indicator within the first camera field of view; a video display adapted to display the first video feed and the indicator.

Another embodiment of the present invention may include a method comprising: generating a first video stream from a vehicle; determining the position of the vehicle; determining the optical axis of the first video stream and the first field of view; determining a first calculated field of view from the position of the vehicle and the first field of view; calculating the position of an indicator using the first calculated field of view; generating an image of the indicator; and displaying the image of the indicator with the first video stream.

Advantageous Effects

The advantages of the present invention are that live video images taken from a moving vehicle may be presented with useful indicia. The indicia may be useful to law enforcement, military, and other civil applications.

BEST MODE

Figure 1:
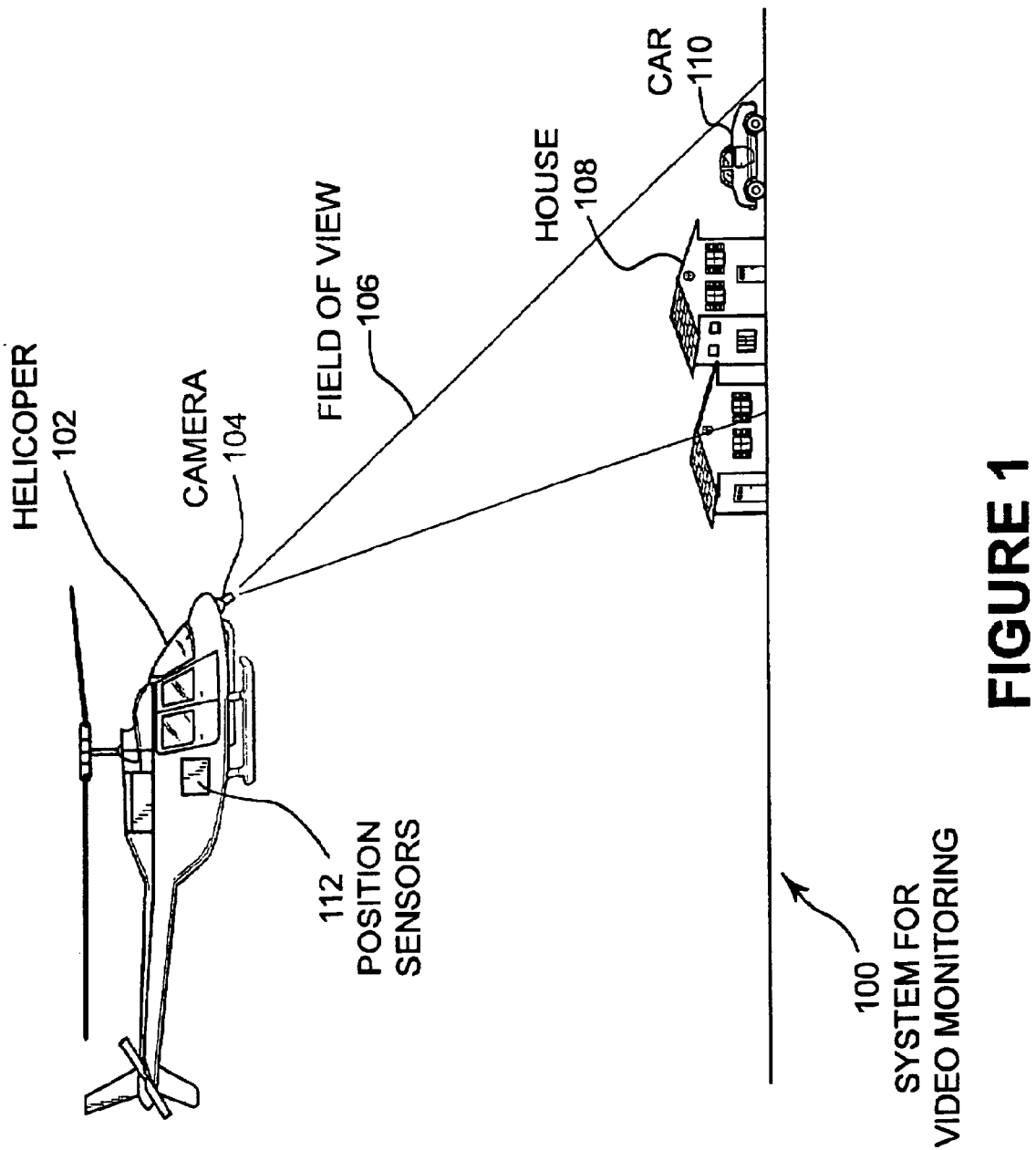
FIG. 1 is a pictorial illustration of an embodiment of the present invention showing a system for video monitoring.

While the invention is susceptible to various modifications and alternative forms, specific embodiments thereof are shown by way of example in the drawings and will herein be described in detail. It should be understood, however, that there is no intent to limit the invention to the particular forms disclosed, but on the contrary, the invention is to cover all modifications, equivalents, and alternatives falling within the spirit and scope of the invention as defined by the claims. Like reference numbers signify the elements throughout the description of the figures. It will also be understood that when an element is referred to as being 'connected' or 'coupled' to another element, it can be directly connected or coupled to the other element or intervening elements may also be present. In contrast, when an element is referred to as being 'directly connected' or 'directly coupled' to another element, there is no intervening elements present.

The present invention may be embodied as devices, systems, methods, and/or computer program products. Accordingly, the present invention may be embodied in hardware and/or in software (including firmware, resident software, micro-code, etc.) Furthermore, the present invention may take the form of a computer program product on a computer-usable or computer-readable storage medium having computer-usable or computer-readable program code embodied in the medium for use by or in connection with an instruction execution system. In the context of this document, a computer-usable or computer-readable medium may be any medium that can contain, store, communicate, propagate, or transport the program for use by or in connection with the instruction execution system, apparatus, or device.

The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a random access memory (RAM), an erasable programmable read-only memory (EPROM or Flash memory), an optical fiber, a portable compact disc read only memory (CD-ROM), and a digital video disk read only memory (DVD-ROM). Note that the computer-usable or computer-readable medium could even be paper or another suitable medium upon which the program is printed, as the program can be electronically captured, via, for instance, optical scanning of the paper or other medium, then compiled, interpreted, of otherwise processed in a suitable manner, if necessary, and then stored in a computer memory.

FIG. 1 illustrates an embodiment 100 of the present invention showing a system for video monitoring. A helicopter 102 has a mounted and gimbaled camera 104. The camera 104 has a field of view 106 that covers a house 108 and a car 110. The helicopter 102 is fitted with position sensors 112.

The helicopter 102 may be any type of aircraft, land vehicle, or watercraft. In this specification, a helicopter is used as an example vehicle to best show the various elements of the invention. Other embodiments may use airplanes, balloons, remotely controlled aircraft, cars, trucks, military armored vehicles, motorcycles, bicycles, amphibious vehicles, boats, ships, submarines, spacecraft, satellites, or any other mobile device. In some cases, the vehicle may be a pedestrian.

The camera 104 may be fixed mounted to the helicopter 102 or may be movable and controllable. For applications such as a helicopter, airplane, or other aircraft, a stabilized camera mount may be desired. Such a camera mount may use gyroscopes or other inertial devices to dampen vibrations or fluctuations in the vehicle's movement.

If the camera 104 is moveable with respect to the helicopter 102, sensors may be mounted to the camera 104 mounting to determine the position of the camera 104 with respect to the helicopter 102. Such sensors may be angular or linear encoders attached to sense the angular or linear displacement of the camera's optical axis. In one embodiment, angular encoders may be mounted to measure the roll, pitch, and yaw of the camera. An additional encoder may be used to measure the zoom or field of view of the camera 104.

In some systems, the various camera position sensors may be mounted to a stabilized inertial system such that the measurements of the sensors are with respect to the inertial system and not with respect to the vehicle frame.

The helicopter 102 has a set of position sensors 112 that are connected to the vehicle. The position sensors may include global positioning system (GPS) receivers, inertial navigation sensors, altimeters, compasses, attitude position sensors, speed sensors, or any other device useful in determining either an accurate or gross measurement of the vehicle position.

By knowing the vehicle position plus the position of the camera's optical axis, a video feed from the camera may be overlaid with various useful indicia.

Figure 2A:
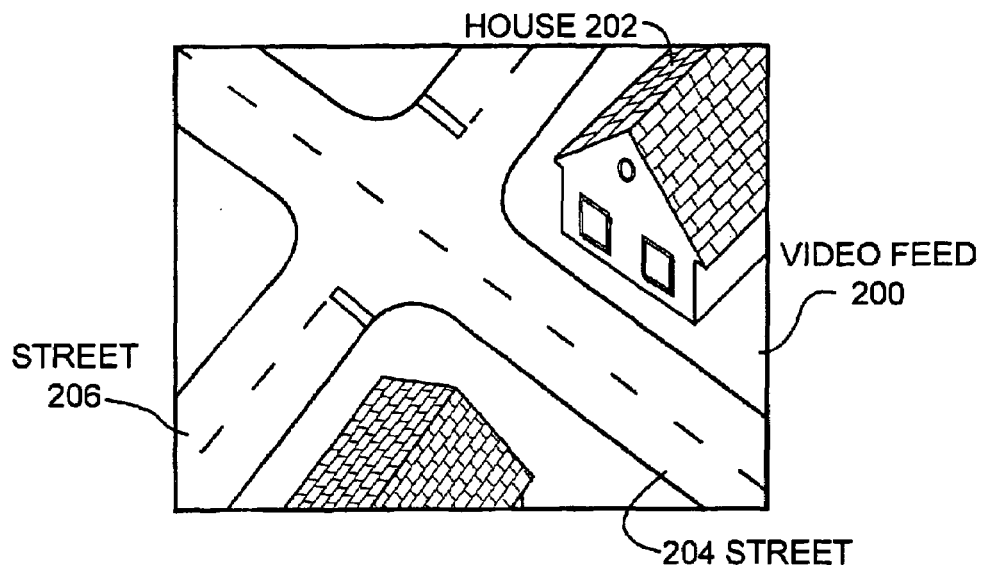
FIG. 2A is a pictorial illustration of an embodiment of the present invention showing a video feed without overlay indicia.

FIG. 2A illustrates an embodiment 200 of a video feed without overlay indicia. The video feed 200 shows a house 202 and streets 204 and 206.

The embodiment 200 may be an example of a video image taken by a police helicopter during a search for a suspect. A particular difficulty with such a video feed is that the video operator is zoomed so far in that landmarks may be difficult to determine. Because there are few landmarks, it may be difficult for someone to direct police officers to the scene or location of a suspect.

Figure 2B:
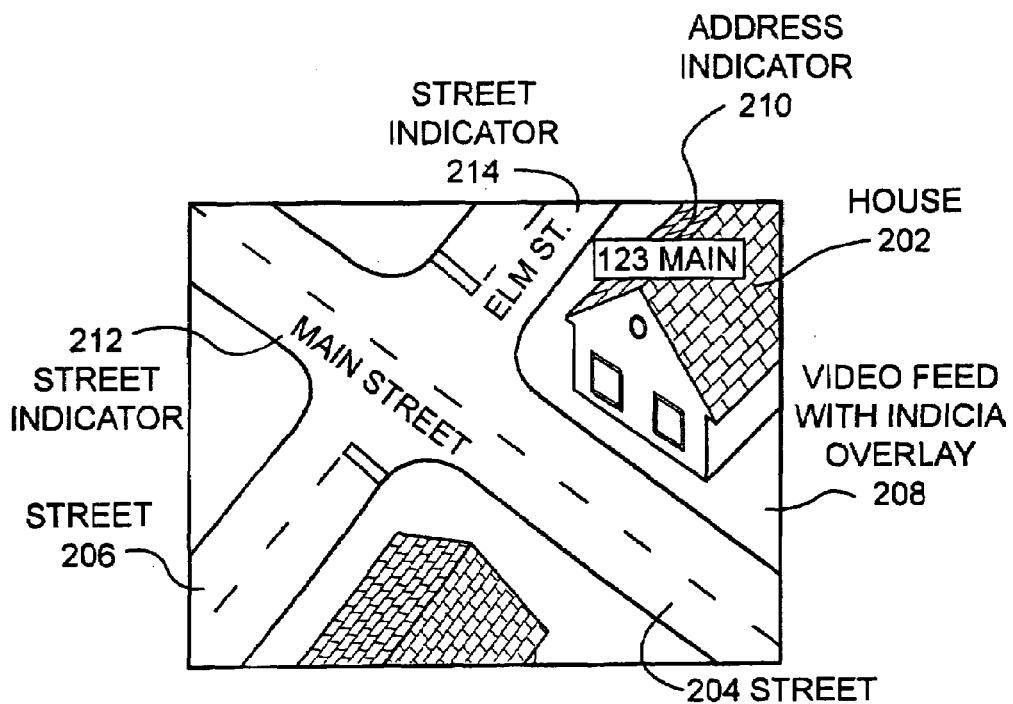
FIG. 2B is a pictorial illustration of an embodiment of the present invention showing the video feed of FIG. 2A with an indicia overlay.

FIG. 2B illustrates an embodiment 208 of the video feed of FIG. 2A with an indicia overlay. The house 202 may be overlaid with an address indicator 210. Similarly, streets 204 and 206 may have street indicators 212 and 214 overlaid.

In the present embodiment of a police helicopter video, the video screen with the indicia give much more useful and important information to the dispatcher who is directing the movement of officers on the scene. For example, in embodiment 200 of the pure video feed, it would be difficult to determine which intersection or which house is in the field of view, especially when the area is a large subdivision with many similar homes and streets. In the embodiment 208, the address of the home in the image is given, along with the cross streets. This information could be extremely useful in directing additional officers to the scene.

Many types of indicia can be overlaid on top of the video feed. For example, topographic lines, geographic features, location and labels of roads and highways, names and addresses of buildings, population densities or demographic information, phone numbers, etc.

In some applications, real time data may be available to be shown as indicia. For example, real time traffic speeds along a highway may be shown as a semi-transparent color overlay. In another example, the signals from a traffic light may be overlaid on the intersection.

In other applications, information regarding vehicles or locations on the ground may be displayed as indicia on the screen. For example, a vehicle position sensor and other sensors may be mounted in a land vehicle. That vehicle may transmit its sensory information to the indicia generator for display. A police or friendly military vehicle may transmit a location and other status information that can be overlaid on the video display. A police vehicle may send status information such as whether the policeman is in the vehicle or on foot. A military vehicle may send status information such as the available weapons, number of people on board, vehicle systems information, or other information as required.

Figure 3:
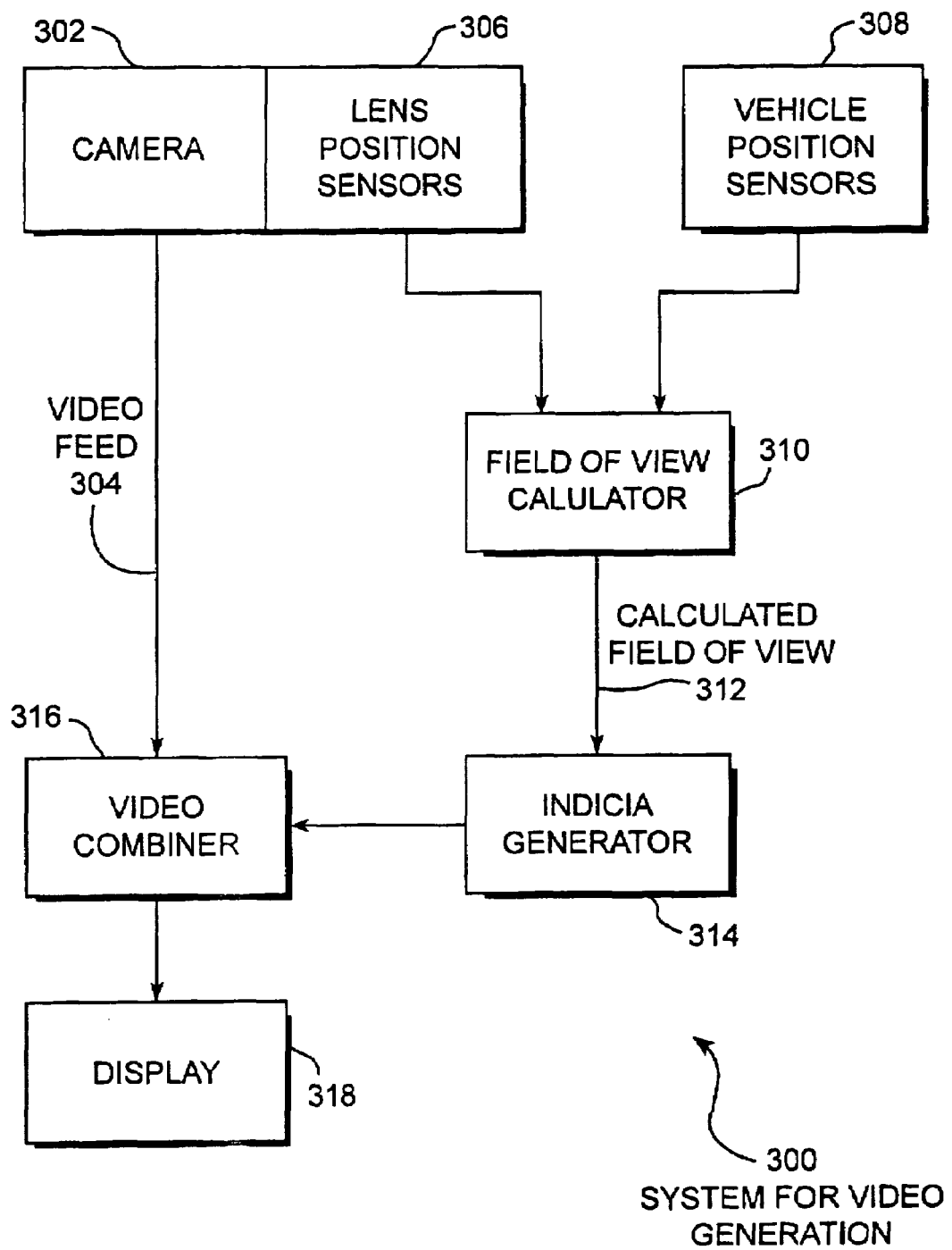
FIG. 3 is a diagrammatic illustration of an embodiment of the present invention showing a system for video generation.

FIG. 3 illustrates an embodiment 300 showing a system for video generation. A camera 302 generates a video feed 304. Mounted to the camera 302 are lens position sensors 306. The lens position sensors 306 and the vehicle position sensors 308 are fed into a field of view calculator 310, which produces a calculated field of view 312. The calculated field of view 312 is used by an indicia generator 314 to generate indicia that is combined with the video feed 304 in a video combiner 316. The combined video feed 304 and indicia are displayed on the display 318.

The field of view calculator 310 calculates the coordinates of the field of view of the video feed 304 using the lens position sensors 306 and the vehicle position sensors 308. When the vehicle position is known, the lens position sensors determine the relative position of the camera optics to the vehicle. From there, coordinates of the video image can be derived.

The embodiment 300 uses the lens position sensors 306 and the vehicle position sensors 308 to calculate the coordinates of the image taken by the camera. By knowing the coordinates used to create the camera image, an overlay of indicia that coordinate with the video image may be produced.

In some embodiments, all of the components may be located in the vehicle. In an example of a police command helicopter, the video image may be used by a commander or dispatcher located in the helicopter to direct officers to and around a scene. In another embodiment, the video feed 304 and the sensor outputs 306 and 308 may be transmitted to a command center where the field of view calculator and indicia generator is located. The combined video may then be viewed or transmitted to yet another location.

In some embodiments, the field of view calculator 310 may be located in the vehicle while the indicia generator 314 may be located at a command center or remote data processing center.

In still other embodiments, several indicia generators may be used in parallel to generate custom images suitable for different persons. For example, one set of indicia may include navigation notations and may be displayed for an officer dispatched to the scene. Another set of indicia may include information relating to the occupants of a home in the field of view and may be displayed to a dispatcher who may attempt to notify the occupants of a disturbance nearby.

In some embodiments, the indicia generator 314 may be located in the vicinity of the display 318 or may be located remotely.

Figure 4:
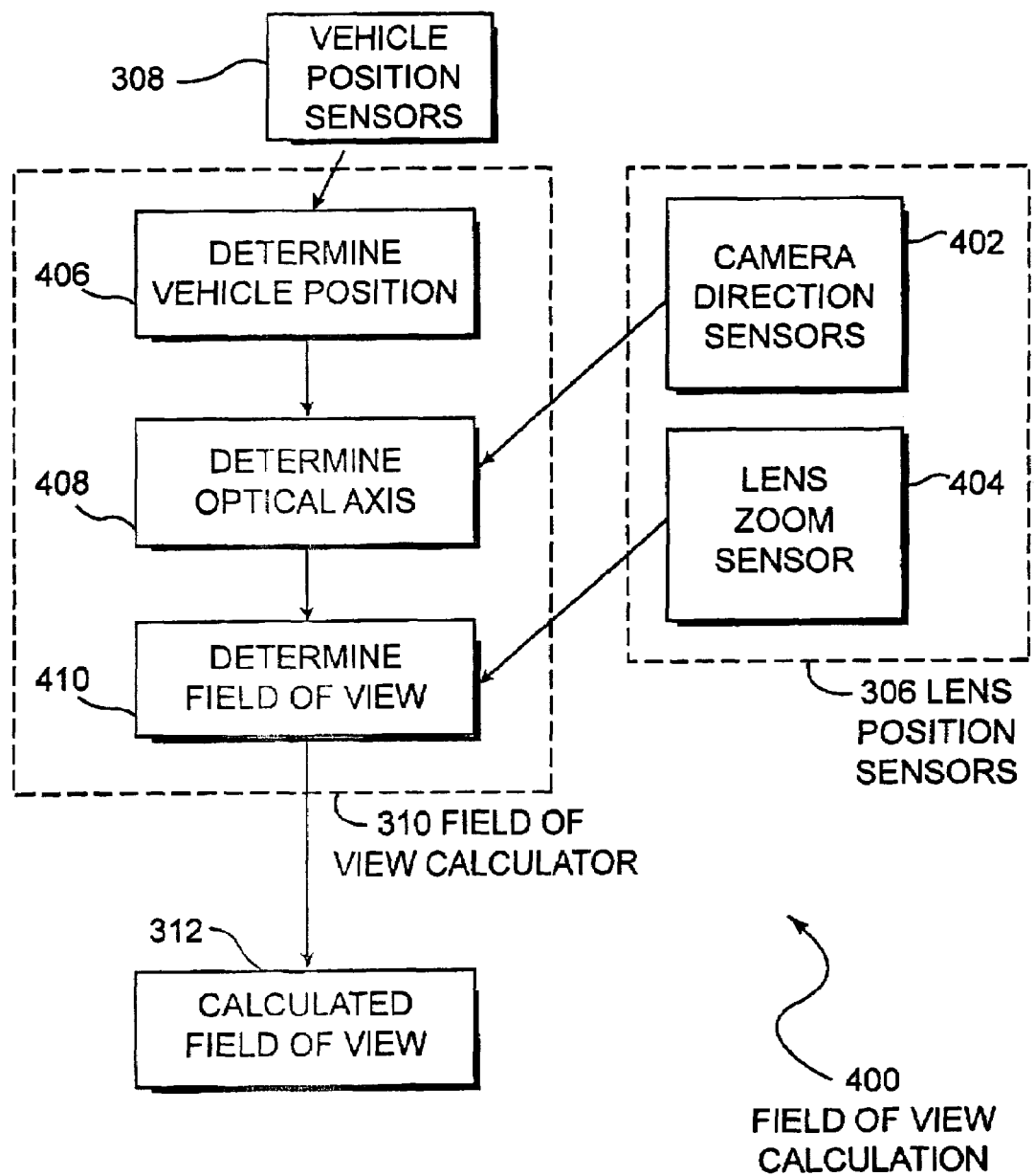
FIG. 4 is a diagrammatic illustration of an embodiment of the present invention showing a field of view calculation.

FIG. 4 illustrates an embodiment 400 showing a system for field of view calculation. The vehicle position sensors 308 are used to determine the vehicle position 406. Camera direction sensors 402 are used to determine the optical axis 408. The lens zoom sensor 404 is used to determine the field of view 410. The result of the field of view calculator 310 is the calculated field of view 312.

The vehicle position may be calculated in block 406 through any practical method. Direct measurement of the vehicle position may be accomplished by measuring the distance from the vehicle to one or more landmarks. For example, the global positioning system (GPS) uses several earth satellites to broadcast signals that are triangulated by a GPS receiver.

Other techniques may use an impulse radio broadcast that is received by several antennas, either ground based or mobile. The impulse radio broadcast may be used to triangulate the position of the vehicle. One such system that is envisioned may involve broadcasting an impulse radio transmission from the vehicle, having that transmission received by one, two, or more receivers. A central controller may then triangulate the vehicle's position and transmit the position to the vehicle.

In another technique, the vehicle may use laser range finding devices to triangulate its position by measuring the distance to one or more landmarks. In some systems, the direction of the laser beam may be measured along with the distance to determine position. In some cases, a laser altimeter may be used to accurately measure the distance from the ground.

In yet another technique, astronomical measurements of the sun, moon, and stars may be used to determine the position of the vehicle.

The vehicle position may be derived in part from dead reckoning. The vehicle's location may be very accurately known at one or more times during the vehicle's operation. For example, a helicopter's position may be accurately known at the beginning of its flight or after some triangulation method. For the period of time after such measurement is taken, inertial dead reckoning devices such as speed sensors, attitude sensors, accelerometers, or other inertial navigational aids may be used to determine the approximate position of the vehicle during its movement.

In yet another technique described below, the position of the vehicle may be derived from analysis of the video image and comparing the calculated position of one or more landmarks with the actual position of the images in the video stream.

The optical axis of the camera in block 408 may be determined from the camera direction sensors. In some embodiments, the video camera may be mounted directly to the body of the vehicle. In other embodiments, the video camera may be pivotally mounted to the vehicle. In such cases, each axis of movement of the camera may be outfitted with a sensor such as a rotational or linear encoder or other sensor. By knowing the position of the vehicle and the relative position of each axis of movement of the camera mounts, the optical axis may be derived.

In other embodiments, the video camera may be mounted on an isolated camera mount or platform. In such a system, the camera mount may have gyroscopes, accelerometers, or other active or passive devices that keep the camera focused in one direction without regard to the attitude or position of the vehicle. When such a system is employed, the optical axis of the camera may be determined in block 408 without regard to the vehicle's attitude.

The lens zoom sensor 404 may be used with the optical axis determination of block 408 to determine the field of view 410. When the positions of the vehicle and camera are known, and the direction of the optical axis are known, the amount of zoom of the lens system of the camera can be used to determine the overall field of view.

In some embodiments, the field of view may be defined by a ray defined by the vehicle position and direction of the optical axis, a second vector defining the rotational position of the video camera with respect to the optical axis, and the angular field of view of the optics. In other embodiments, the calculated field of view may be defined by the four corners of the video image in latitude and longitude coordinates.

Various methods of defining the calculated field of view are possible in different embodiments of the present invention. Those skilled in the art will appreciate that different definitions of the calculated field of view may have certain benefits and detriments based on the various calculations performed or based on the architecture of the databases or other components of the entire system. The examples herein are exemplary in nature and should not be construed as limiting the invention to the examples shown.

Figure 5:
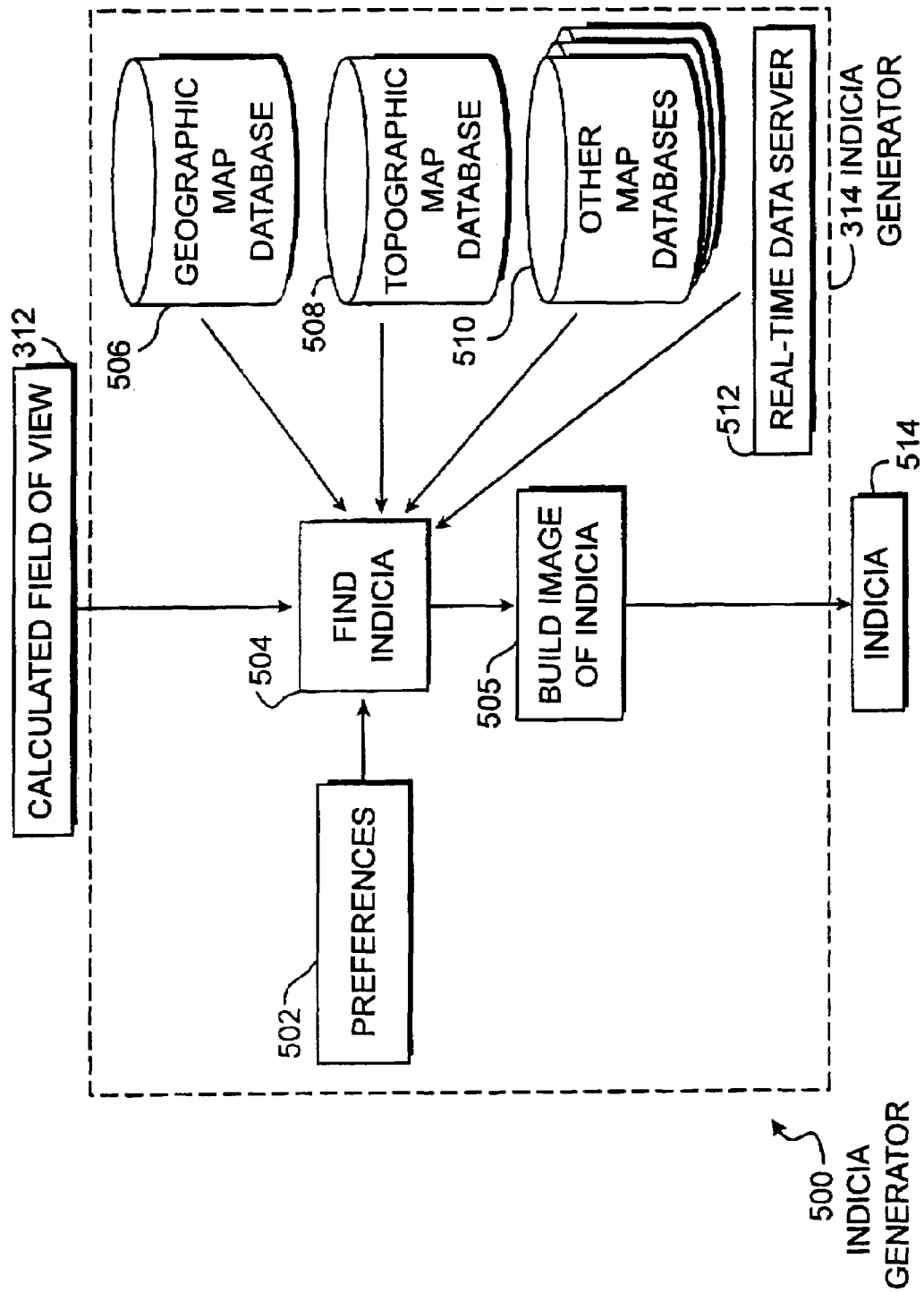
FIG. 5 is a diagrammatic illustration of an embodiment of the present invention showing an indicia generator.

FIG. 5 illustrates an embodiment 500 of an indicia generator. The calculated field of view 312 is used by the indicia generator 314 to produce indicia 514. Preferences 502 may be used with the find indicia block 504 and several data sources, including a geographic map database 506, a topographic map database 508, other map databases 510, and a real-time data server 512. After indicia are identified, the images of the indicia are generated in block 505 to produce the viewable indicia 514.

The find indicia block 504 uses the calculated field of view 312 to sort through the various data sources based on the preferences 502. The preferences 502 may be preset for certain applications or may be selectable.

For example in a military training scenario, an aerial camera may be dispatched to view a training exercise. In such an exercise, there may be many vehicles and personnel each of which may have a GPS receiver and transmitter to send the GPS locations to a central real-time server. Each field unit within the field of view may be displayable using an embodiment of the present invention. However, the preferences for one viewer may have only one team's locations displayed while the preferences for a military observer may have all the locations displayed.

Various indicia may be useful in different situations. In an example of a nocturnal situation, an aerial surveillance using infrared video may show very few images. In such a situation, topographic lines marking various elevation changes may produce a much more useful video image, since the position of hills or valleys may be superimposed on the image.

Geographic map databases 506 may be used to display highway indicators, city names, or other geographical features such as tunnels, bridges, airports, mountains, bus stops, train stations, and the like. Additionally, addresses, direction of traffic flow, intersections, and other indicators may be generated.

In some situations, certain indicia may be displayed based on the size of the field of view. For example, with a wide field of view, several cites may be visible, especially for high altitude aerial surveillance. Only main arterial roads may have indicia visible. When the camera is zoomed into a neighborhood, other indicia pertinent to that view would be illuminated, such as street addresses.

The indicia are built into a viewable image in block 505. This step may involve creating an overlay video image. Creating such an image may include placing the indicia at an appropriate location on the overlay and positioning the image to fit the particular field of view. For example, an oblique camera angle may require that topographic lines corresponding to elevation changes be skewed to align with the video image. In other examples, an address of a house may be aligned horizontally to the video image regardless of the camera position. In another example, a street indicator may be canted to align with the direction of the street.

Figure 6:
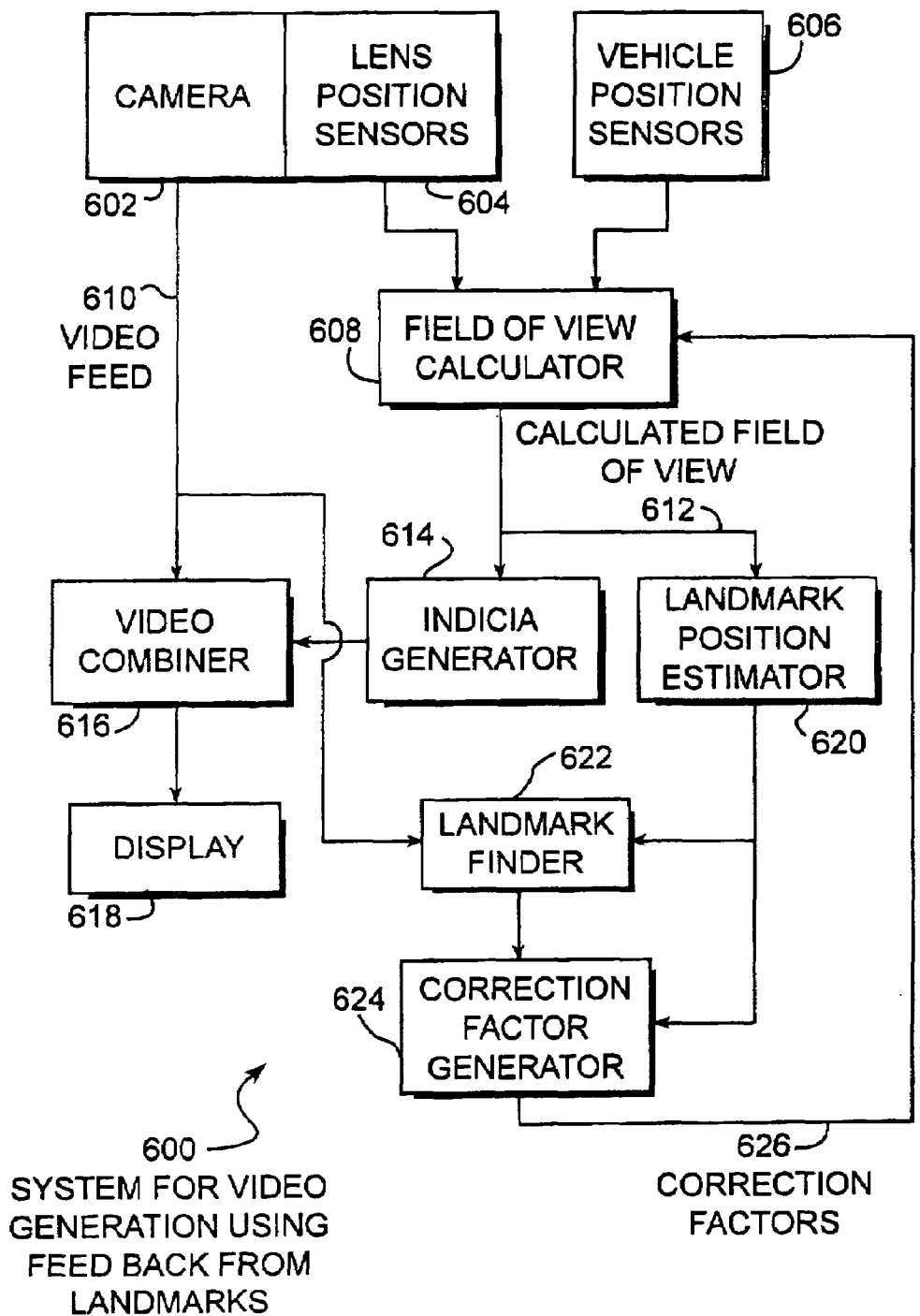
FIG. 6 is a diagrammatic illustration of an embodiment of the present invention showing a system for video generation using a feedback loop.

FIG. 6 illustrates an embodiment 600 showing a system for video generation using a feedback loop. Camera 602 has lens position sensors 604. The lens position sensors 604 and vehicle position sensors 606 are used by a field of view calculator 608 to produce a calculated field of view 612. The calculated field of view 612 is used by the indicia generator 614 which feeds indicia to a video combiner 616. The video combiner 616 combines the indicia with the video feed 610 to show on a display 618.

The calculated field of view 612 is used by a landmark position estimator 620 to determine a calculated position of a certain landmark. The landmark finder 622 attempts to find the landmark on the video feed 610. The actual and calculated landmark positions are compared in the correction factor generator 624 to produce correction factors 626 that are fed back into the field of view calculator 608.

The embodiment 600 uses landmarks within the video feed 610 to more accurately position the indicia on the combined video signal. Based on the calculated field of view 612, one or more landmarks are selected and their positions are calculated by the landmark position estimator. The landmarks may be certain geographic features such as buildings, roads, mountains, or may be beacons used for other purposes or specifically designed for use with the present invention. For example, a beacon such as a lighthouse or antenna tower may be used. In another example, painted markings on a highway or a temporary marker may be placed on the ground for use with the present invention.

For example, if the landmark was a specific building with a particular outline, the landmark position estimator 620 may create an outline of the building based on the particular viewing angle and distance of the camera. The actual outline of the building may be compared to the generated outline to determine correction factors.

In some cases, the landmarks may be moving vehicles that have position sensors in communication with the landmark position estimator 620. The positions may be transmitted to the landmark position estimator 620 for the purposes of correcting the field of view only or in conjunction with indicia marking that vehicle on the display 618.

The estimated location of the landmark may be used by the landmark finder 622 to more quickly find the landmark on the video feed 610. The landmark finder 622 may use any image analysis routine to find the landmark within the video feed 610. Various filters and other image processing techniques can be used, as will be appreciated by those skilled in the arts.

For example, an algorithm may be used to maneuver the calculated position of the landmark so that it aligns with the video image of the landmark using a best fit algorithm. The position, skew, zoom, or other manipulation required to achieve the best fit can be used to determine correction factors. The correction factors may also be interpreted to determine a more precise position of the vehicle.

Figure 7:
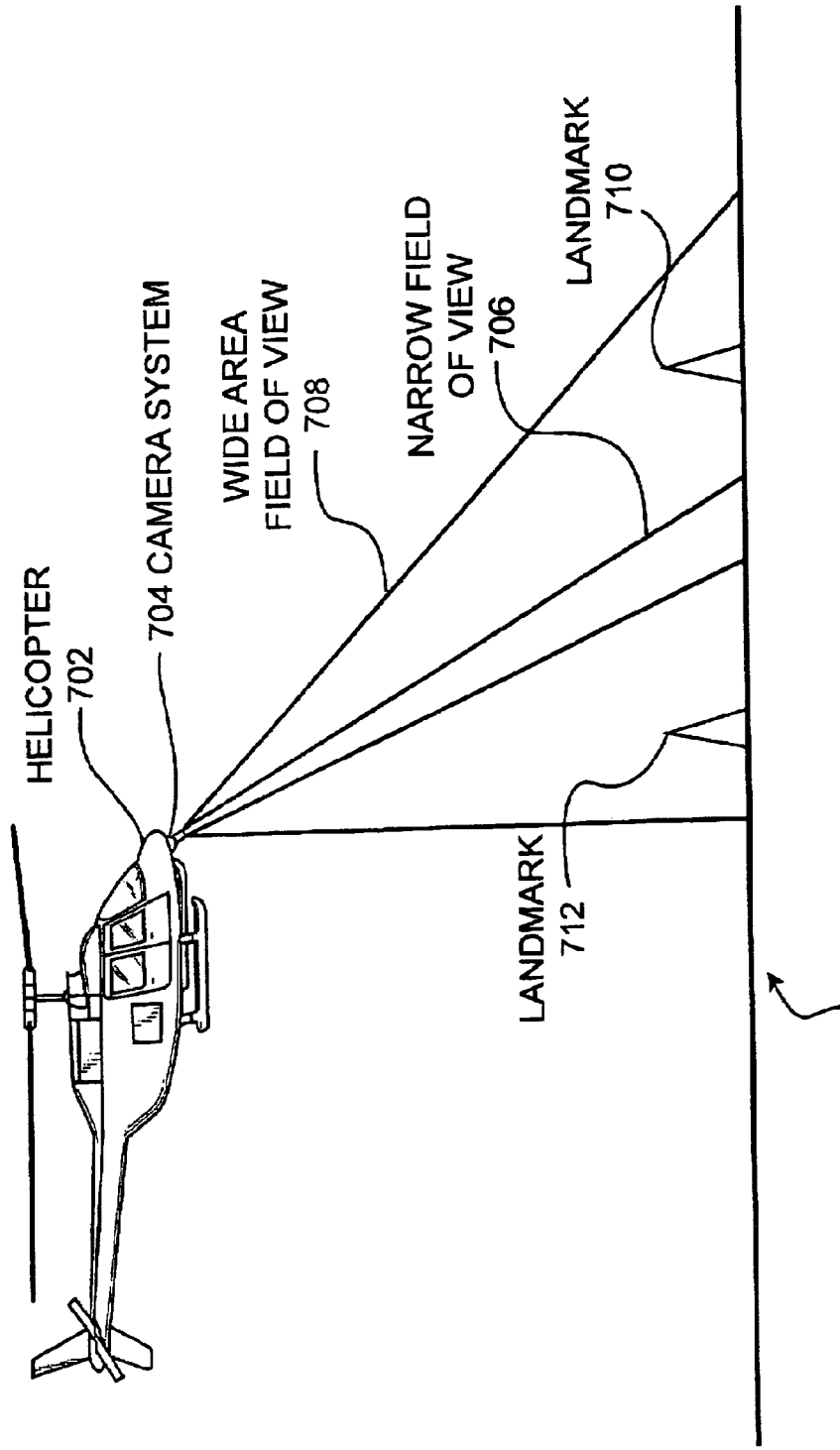
FIG. 7 is a pictorial illustration of an embodiment of the present invention showing a system for video monitoring having two parallel cameras.

FIG. 7 illustrates an embodiment 700 showing a system for video monitoring having two parallel cameras. The camera system 702 may contain two cameras, a first camera having a narrow field of view 706, and a second camera having a wide field of view 708. The landmarks 710 and 712 are shown in the wide field of view 708 of the second camera.

The embodiment 700 uses two cameras that may be mounted with their optical axes substantially parallel. One camera may have a telephoto lens and generate the video feed for a display while the other camera has a wide angle lens and is used to compare actual landmark locations with the calculated landmark locations.

Figure 8:
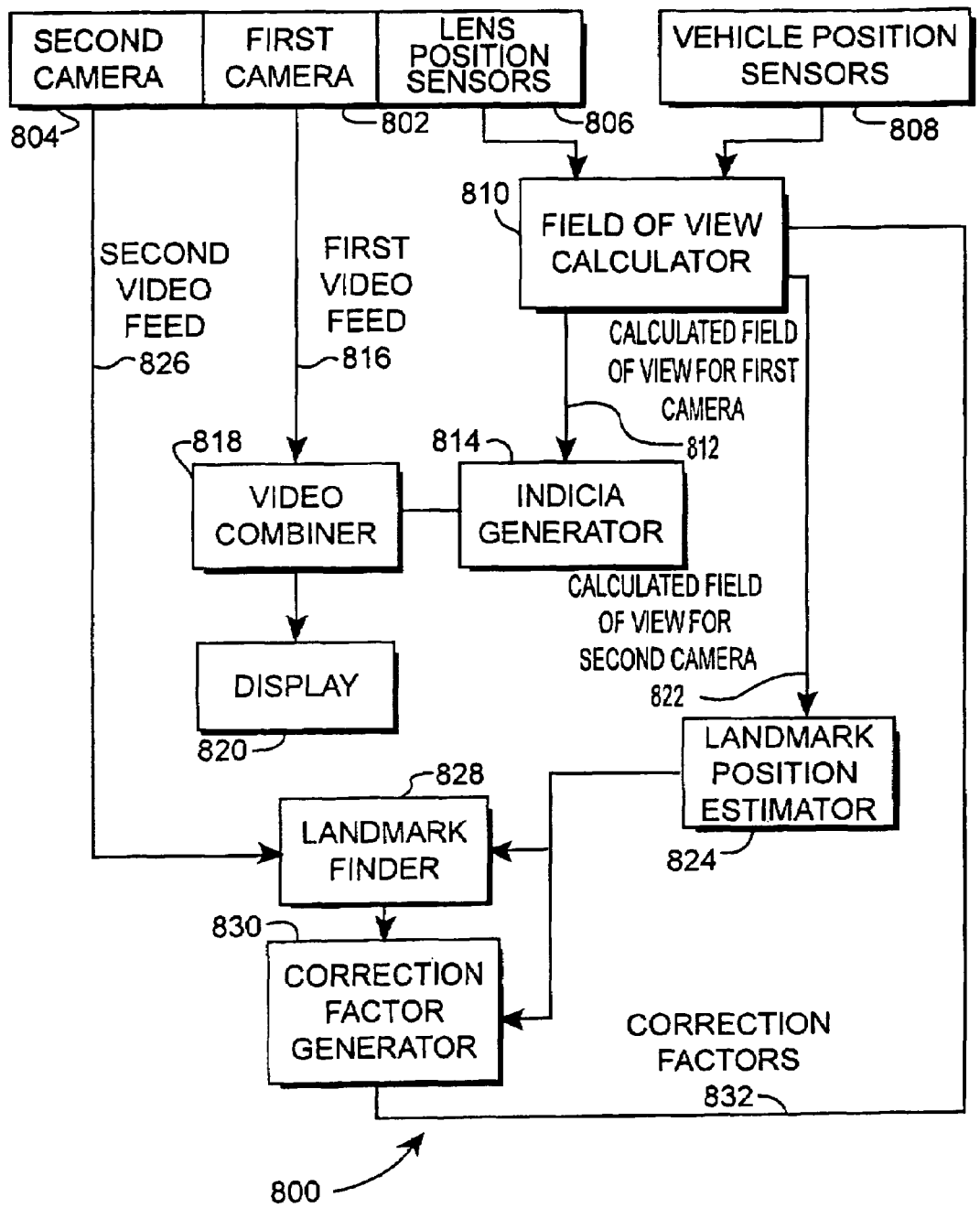
FIG. 8 is a diagrammatic illustration of an embodiment of the present invention showing a system for video monitoring having two parallel cameras.

FIG. 8 illustrates an embodiment 800 showing a system for video monitoring having two parallel cameras. A first camera 802 and second camera 804 are mounted so that their optical axes are substantially parallel. The lens position sensors 806 mounted on the cameras 802 and 804 are fed into the field of view calculator 810 along with the vehicle position sensors 808. The field of view calculator 810 generates a calculated field of view for the first camera 812, which is fed into the indicia generator 814. The video feed 816 from the first camera 802 is mixed with the indicia in the video combiner 818 and displayed on the display 820.

The field of view calculator 810 also generates a calculated field of view for the second camera 822, which is fed into the landmark position estimator 824. The landmark finder 828 uses the second video feed 826 to find the actual landmark position. The landmark finder 828 may use some output from the landmark position estimator 824 in finding the landmark. The actual and estimated landmark positions are compared in the correction factor generator 830, which generates correction factors 832 that are fed back into the field of view calculator 810.

The embodiment 800 uses a wide area camera to locate and compare landmarks to determine any correction factors used by the field of view calculator 810. In some embodiments, the second camera 804 may be much different video image than that of the first camera 802. For example, the second camera 804 may be an infrared camera while the first camera is a natural light camera. In such a case, the various landmarks may be infrared landmarks not visible to the human eye.

For example, ground based transmitters may illuminate and be used as a beacon. The transmitters may display light in the visual spectrum, infrared, ultraviolet, or other spectrum. In some embodiments, the beacons may display a continuous or single burst pulse train of signals that may be used to communicate with the vehicle. The pulse trains may identify the landmark, give coordinates of the landmark, or any other communication. In some other embodiments, the vehicle may have the ability to turn on and off the beacons by communicating with the beacons in some manner.

The field of view of the second camera 804 may be much larger than that of the first camera 802. In such embodiments, the first camera 802 may be used for tight zoomed-in shots that do not have many, if any, landmarks to compare positions. In such cases, the second camera may capture a much larger area that is more likely to have landmarks that can be compared.

In other embodiments, the field of view of the second camera 804 and the first camera 802 may be substantially similar. In such embodiments, one camera may be viewing the infrared spectrum or some other spectrum, while the other camera is viewing a different spectrum, such as the visible spectrum.

Figure 9:
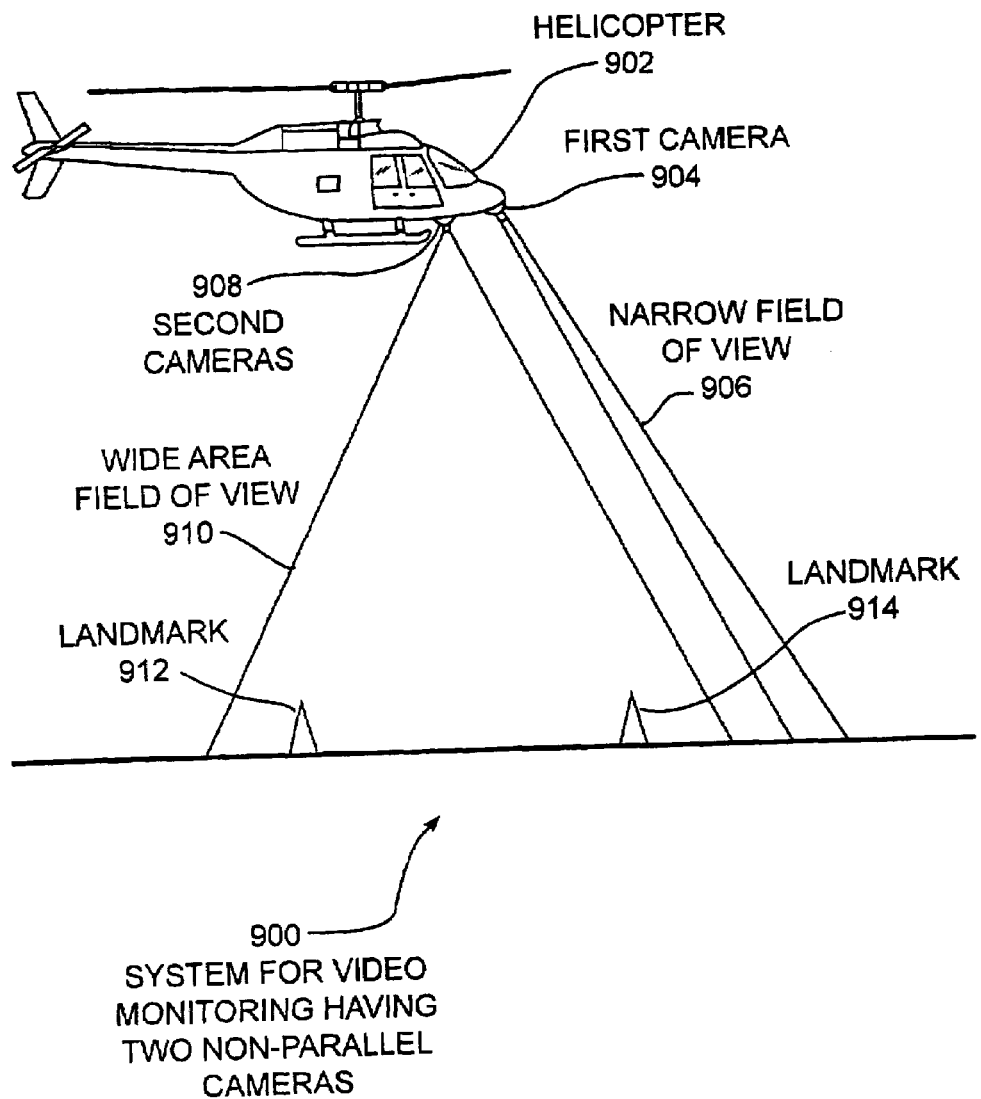
FIG. 9 is a pictorial illustration of an embodiment of the present invention showing a system for video monitoring having two non-parallel cameras.

FIG. 9 illustrates an embodiment 900 of a system for video monitoring having two non-parallel cameras. The helicopter 902 has a first camera 904 that has a narrow field of view 906. A second camera 908 has a wide field of view 910 that captures landmarks 912 and 914.

The embodiment 900 uses the first camera 904 for a video feed that may contain indicia and the second camera 908 for locating landmarks 912 and 914 that can be used to determine the position of the helicopter 902 or be used as correction factors in calculating the field of view.

The second camera 908 may be directly mounted to the vehicle, may have a gimbaled mount with sensors attached to each axis of freedom, or may have a stabilized and gimbaled mount as described above.

Figure 10:
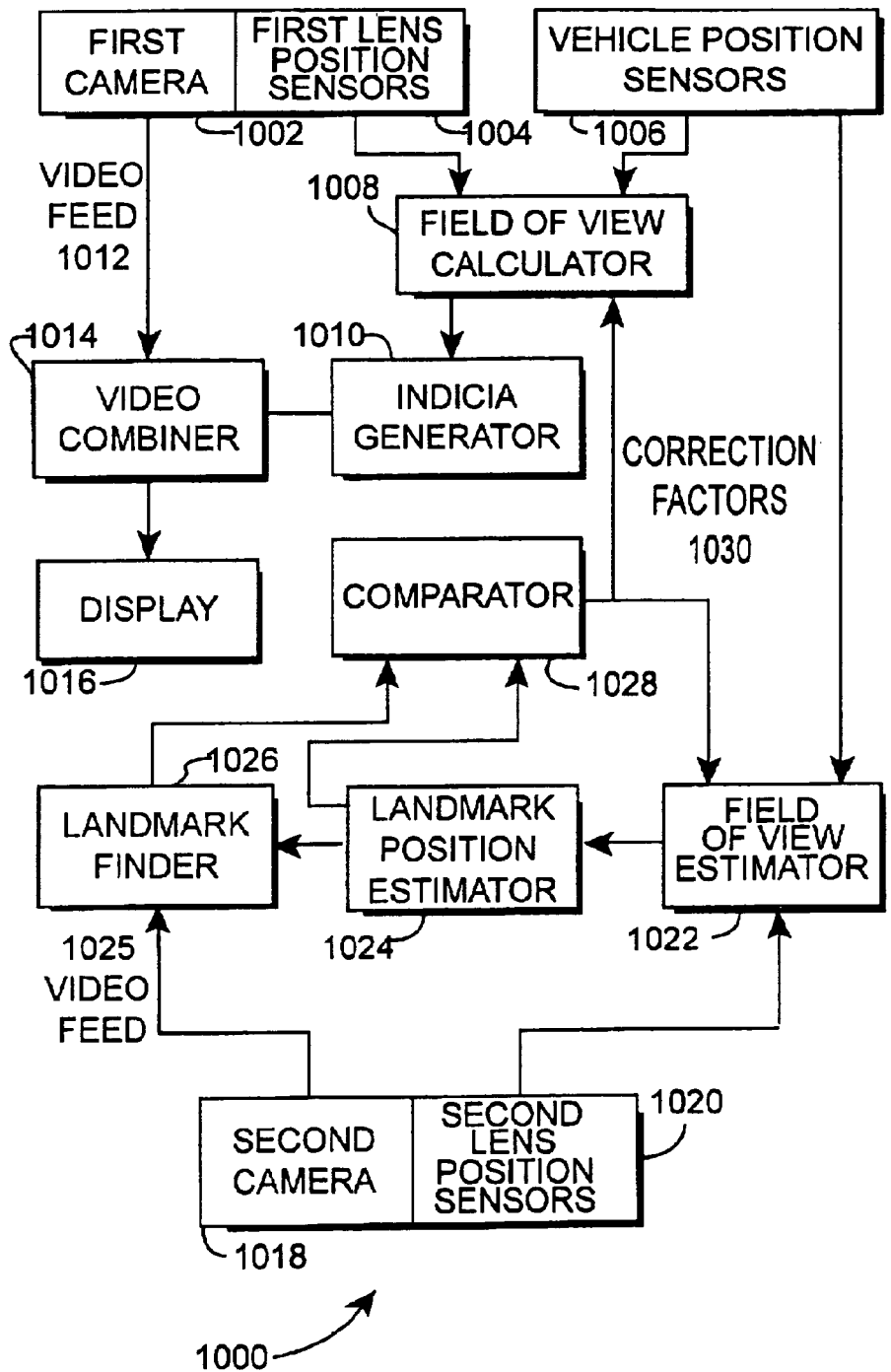
FIG. 10 is a diagrammatic illustration of an embodiment of the present invention showing a system for video monitoring having two non-parallel cameras.

FIG. 10 illustrates an embodiment 1000 of a system for video monitoring having two non-parallel cameras. A first camera 1002 has lens position sensors 1004 attached thereto. The lens position sensors 1004 and the vehicle position sensors 1006 are fed into the field of view calculator 1008, which feeds the indicia generator 1010. The indicia generator produces indicia that are fed into the video combiner 1014 where the video feed 1012 and indicia are combined. The results are displayed on the display 1016.

A second camera 1018 with its own position sensors 1020 are also mounted to the vehicle. The second set of lens position sensors 1020 are fed into a field of view estimator 1022, which feeds the landmark position estimator 1024. The video feed 1025 is analyzed by the landmark finder 1026 to locate the actual landmark positions. The actual and calculated landmark positions are compared in the comparator 1028 to generate correction factors 1030 which are fed into the field of view calculator 1008 and field of view estimator 1022.

The field of view estimator 1022 is substantially similar to the field of view calculator 1008 except that two different sets of inputs are used: one for the first camera, and one for the second, respectively.

The embodiment 1000 is similar to embodiment 800 except that the second camera has its own set of lens position sensors 1020. This allows the second camera to be pointed in a direction that may have more prominent landmarks, regardless of the direction of the first camera. For example, the second camera 1018 may be pointed directly down towards the ground while the first camera 1002 may be pointed towards some activity further towards the horizon.

The comparison of the actual and calculated landmarks is one method to determine the vehicle's position. In some embodiments, the correction factors 1030 may be actual location coordinates of the vehicle in three dimensions. In other embodiments, the correction factors 1030 may be offsets or adjustments that may be made to correct the vehicle position. In such a case, the offsets may be numerical or other indicators with no significant meaning.

The foregoing description of the invention has been presented for purposes of illustration and description. It is not intended to be exhaustive or to limit the invention to the precise form disclosed, and other modifications and variations may be possible in light of the above teachings. The embodiment was chosen and described in order to best explain the principles of the invention and its practical application to thereby enable others skilled in the art to best utilize the invention in various embodiments and various modifications as are suited to the particular use contemplated. It is intended that the appended claims be construed to include other alternative embodiments of the invention except insofar as limited by the prior art.

The invention claimed is:

1. A system comprising:
   a vehicle having vehicle position sensors;
   a first video camera mounted to said vehicle and producing a first video feed in a first camera field of view; said first video camera having a first optical axis;
   a second video camera having camera position sensors, a second optical axis, and a second camera field of view, said second video camera being mounted to said vehicle, said second camera field of view being larger than said first camera field of view, said second video camera further producing a second video feed;
   a field of view calculator adapted to:
      use said vehicle position sensors and said camera position sensors to produce a first calculated field of view;
      determine that a first landmark is approximately located within said first camera field of view;
      determine a calculated position of said first landmark within said second camera field of view;
      find the actual position of said landmark within said second video feed;
      compare said calculated position and said actual position of said landmark to determine a set of correction factors; and
      use said correction factors to change said first calculated field of view;
   an indicia generator adapted to use said first calculated field of view to produce at least one indicator within said first camera field of view;
   a video display adapted to display said first video feed and said indicator.

2. The system of claim 1 wherein said first optical axis is substantially parallel to said first optical axis.

3. The system of claim 1 wherein said first optical axis is not parallel to said first optical axis.

4. The system of claim 1 wherein said landmark comprises a stationary object.

5. The system of claim 1 wherein said landmark comprises a movable object.

6. The system of claim 5 wherein said landmark comprises a second vehicle having a set of second vehicle sensors in communication with said field of view calculator.

7. The system of claim 1 wherein said vehicle is one of a group comprising an aircraft, a land vehicle, and a watercraft.

8. The system of claim 1 wherein said vehicle position sensors comprises at least one from a group comprising a global positioning system receiver, an altimeter, a compass, and a gyroscope.

9. The system of claim 1 wherein said camera position sensors comprises at least one from a group comprising a roll sensor, a pitch sensor, a yaw sensor, and a zoom sensor.

10. The system of claim 1 wherein said indicia comprises at least one from a group comprising latitude and longitude coordinates, a street name, a building address, a building name, and a vehicle.

11. A method comprising:
    generating a first video stream from a vehicle, said first video stream having a first optical axis;
    determining the approximate position of said vehicle;
    determining the optical axis of said first video stream and the first field of view;
    determining a first calculated field of view from said position of said vehicle and said first field of view;
    calculating the position of an indicator using said first calculated field of view;
    determining that a first landmark is approximately located within the first field of view;
    determining a calculated position of said first landmark within said first field of view;
    finding the actual position of said landmark within said first video feed;
    comparing said calculated position and said actual position of said landmark to determine a set of correction factors;
    using said correction factors to change said first calculated field of view;
    generating a second video stream from said vehicle, said second video stream having a second optical axis and a second field of view, said second field of view being smaller than said first field of view;
    determining the position of said second optical axis and said second field of view;
    generating an image of said indicator; and
    displaying said image of said indicator with said second video stream.

12. The method of claim 11 wherein said first optical axis and said second optical axis are substantially parallel.

13. The method of claim 11 wherein said first optical axis and said second optical axis are not substantially parallel.

14. The method of claim 11 wherein said landmark comprises a stationary object.

15. The method of claim 11 wherein said landmark comprises a movable object.

16. The method of claim 15 wherein said landmark comprises a second vehicle having a set of second vehicle sensors in communication with said field of view calculator.

17. The method of claim 11 wherein said vehicle is one from a group comprising an aircraft, a land vehicle, and a watercraft.

18. The method of claim 11 wherein said determining the position of said vehicle comprises at least one output from a group comprising a global positioning system receiver, an altimeter, a compass, and a gyroscope.

19. The method of claim 11 wherein said determining the optical axis of said first video stream and the first field of view comprises at least one output from a group comprising a roll sensor, a pitch sensor, a yaw sensor, and a zoom sensor.

20. The method of claim 11 wherein said indicator comprises at least one from a group comprising latitude and longitude coordinates, a street name, a building address, a building name, and a vehicle.

\* \* \* \* \*